United States Patent
Donadon

(10) Patent No.: US 9,486,846 B2
(45) Date of Patent: Nov. 8, 2016

(54) ELASTIC JUNCTION FOR SLIDING BLOCK ADAPTER

(71) Applicant: Danieli & C. Officine Meccaniche S.P.A., Buttrio (IT)

(72) Inventor: Andrea Donadon, Pordenone (IT)

(73) Assignee: Danieli & C. Officine Meccaniche S.P.A., Buttrio (IT)

( * ) Notice: Subject to any disclaimer, the term of this patent is extended or adjusted under 35 U.S.C. 154(b) by 76 days.

(21) Appl. No.: 14/189,837

(22) Filed: Feb. 25, 2014

(65) Prior Publication Data

US 2015/0240877 A1      Aug. 27, 2015

(30) Foreign Application Priority Data

Feb. 27, 2013   (IT) .............................. MI2013A0287

(51) Int. Cl.
| | |
|---|---|
| *F16D 3/04* | (2006.01) |
| *B21B 35/14* | (2006.01) |
| *F16D 3/72* | (2006.01) |
| *F16D 3/26* | (2006.01) |
| *F16D 3/14* | (2006.01) |

(Continued)

(52) U.S. Cl.
CPC ............ *B21B 35/14* (2013.01); *B21B 35/142* (2013.01); *F16D 3/265* (2013.01); *B21B 35/146* (2013.01); *F16D 3/06* (2013.01); *F16D 3/14* (2013.01); *F16D 3/64* (2013.01)

(58) Field of Classification Search
CPC ............. F16D 3/04; F16D 3/06; F16D 3/10; F16D 3/14; F16D 3/16; F16D 3/20; F16D 3/202; F16D 3/205; F16D 3/207; F16D 3/26; F16D 3/265; F16D 3/28; F16D 3/64; F16D 3/66; F16D 3/70; F16D 3/76; F16D 7/021; F16D 7/024; B21B 35/14; B21B 35/136; B21B 35/141–35/146
USPC ........ 72/245, 246, 249; 464/27–28, 88, 104, 464/110, 112, 114, 128–129, 162, 905
See application file for complete search history.

(56) References Cited

U.S. PATENT DOCUMENTS

| | | | | |
|---|---|---|---|---|
| 2,460,648 | A | * | 2/1949 | Millar ..................... F16D 3/265 384/286 |
| 2,526,072 | A | * | 10/1950 | Fraser ..................... F16D 3/265 384/297 |
| 2,697,335 | A | * | 12/1954 | Peterson ............... B21B 35/146 464/11 |

(Continued)

FOREIGN PATENT DOCUMENTS

| | | |
|---|---|---|
| DE | 2101023 | 9/1972 |
| DE | 2656257 | 6/1978 |

(Continued)

*Primary Examiner* — Peter DungBa Vo
*Assistant Examiner* — Joshua D Anderson
(74) *Attorney, Agent, or Firm* — Stetina Brunda Garred & Brucker

(57) ABSTRACT

The elastic junction for the dynamic connection between the motor side and the head of a sliding block adapter, or between adapter and rolls of a rolling plant, comprises a central pin (5) arranged perpendicular to the longitudinal axis of the adapter (3), multiple sliding blocks (4) connected by means of the pin (5) to the adapter (3), a block (1) fixed to the flange (2) and two interfaced and complementary series of dampers (6) connected to the pin (5). This ensures the reduction of the axial tensions which are transmitted along the adapter in response to stresses caused by rolling.

10 Claims, 4 Drawing Sheets

(51) Int. Cl.
  *F16D 3/64*  (2006.01)
  *F16D 3/06*  (2006.01)

(56) References Cited

U.S. PATENT DOCUMENTS 6,991,546 B2 * 1/2006 Rucker .................. B21B 35/14
                                                    403/361
7,582,019 B2 * 9/2009 Berger .................... B21B 33/00
                                                    464/27
7,784,380 B2 * 8/2010 Berger .................. B21B 35/141
                                                    74/825

FOREIGN PATENT DOCUMENTS

FR    1360547    5/1964
GB    1413767    11/1975

* cited by examiner

ELASTIC JUNCTION FOR SLIDING BLOCK ADAPTER

CROSS REFERENCE TO RELATED APPLICATIONS

The present application claims priority to Italian Patent Application No. MI2013A000287 filed Feb. 27, 2013.

STATEMENT RE: FEDERALLY SPONSORED RESEARCH/DEVELOPMENT

Not Applicable.

BACKGROUND OF THE INVENTION

1. Field of the Invention

The present invention relates to a load damping system, applicable to sliding block adapters used for the transmission of motion generated by a motor connected thereto. Such a system finds application, for example, in the transmission of motion from the motors to the rolls of a rolling stand for flat products. In particular, the present invention relates to an elastic junction for the dynamic connection between the motor side and the adapter head, or between adapter and rolling rolls, such as to ensure the reduction of the axial tensions that are transmitted along the adapter in response to stresses generated during rolling.

2. Background Art

Two types of sliding block adapters are known in the art: fixed adapters and telescopic adapters. The first ones form a rigid body, while the latter have the possibility to vary the axial extension thereof. In the exemplary case of a rolling plant, this second solution allows shifting the rolls or rolling cylinders. Disadvantageously, both types of adapters, and in particular fixed adapters, transmit the axial component of the load, that is generated during the rolling, to the motor. The rolling stand, for example, can in fact generate axial loads due to various phenomena related to the rolling process, which through the adapters can be transmitted from the rolling cylinders to the motor. The ends of the working rolls of the stand, on the side opposite that of the adapters, are accommodated in a chock. Between the chock and the relative fixed shoulder there is a predetermined clearance which, by design, normally has a nominal value of about 1 mm, while it can actually also reach 3-4 mm, being the result of a sum of tolerances and also due to possible wear that may occur over time.

The thrust bearings of the motors generally have an axial clearance limited to ±0.35 mm for reasons of intrinsic functioning of the motors which, therefore, can be still affected by the axial loads generated by the rolling stand since the axial clearance between chocks and shoulders is greater than that of the thrust bearing of the motor.

Thus, the axial forces which develop during the rolling make such a clearance closed, and such forces are then transmitted to the motors through the adapters. These loads are harmful to the motors, which precisely to oppose such stresses are normally provided with radial or axial thrust bearings suitably sized according to the maximum load, since any failure of said bearings would entail putting the motor out of order.

In plants having this size and these features, such as rolling plants, the main motors are absolutely vital for production, and it is therefore essential to prevent failure of these members, which could lead to a shutdown of months also due to the fact that often spare parts are not available in a short time for components of this type and size (these are motors whose power can reach up to 10,000 kW). A plant shutdown is obviously the most negative factor which a producer can experience, as it involves a loss of productivity. Therefore, in order to prevent this from occurring, it is preferred to oversize the axial bearing of the motor, even if this implies a substantial increase in the size of the total expenditure: both radial and axial motor bearings are very expensive and their size consistently impacts the total cost of motors. In the prior art, the junctions between the sliding block adapters and the flanges on the roll side or on the motor side essentially consist of axially rigid systems that, due to such a rigidity, transmit all the loads from the rolling stand to the motor. That is, the adapter junctions are generally obtained by rigidly constraining the constituting parts.

A first example of this type of system is provided by document U.S. Pat. No. 7,582,019B2 in which two sections of an adapter are interconnected through a system of compensation of the axial loads which provides for the use of longitudinal cylindrical dampers arranged both within the connection itself and outside of it. The inner cylinders consist of a guiding jacket within which a sliding damper element can move, whose rectilinear motion takes place along the longitudinal axis of the adapter. This frictional non-rotatable connection is coupled to the outer cylindrical dampers which absorb the axial forces and prevent the twisting of the two interconnected segments of the adapter. In this way, however, this double connection has a rigidity that prevents the effective absorption of the transverse and torsion stresses that normally affect the normal operation of the adapters. This gives the system a lack of elasticity precisely where the greatest stresses coming from the rolling system are formed.

A second axially rigid interconnection system is described in document U.S. Pat. No. 7,784,380. The system involves the use of an interconnection between a flange and the head of an adapter consisting of a housing block rigidly fixed to the end of the adapter and within which a pressure bar is longitudinally arranged. The orientation and the shape of the bar are aimed to withstand and balance the axial thrust and traction loads, while its angular movement is limited by the design degree of freedom of the housing block. Also this solution is therefore affected by the transverse rigidity and torsion rigidity which do not allow the elastic absorption of all the tensions and stresses to which the adapter head is subjected.

In both cases described above, as in every other solution currently adopted in the prior art, a component which is essential for the effective reduction of the loads transmitted to the adapter is therefore lacking, i.e. the elastic and pluridirectional response to such loads, which may effectively reduce any risk for the integrity of the connection junctions and, in particular, of the motors.

SUMMARY OF THE INVENTION

The object of the present invention is to provide an elastic junction for sliding block adapters which allows effectively compensating and absorbing the forces transmitted by the rolling system to the motors.

A further object of the present invention is to provide a junction for sliding block adapters which allows only a certain predefined maximum force to be axially transmitted to the motors.

Another object of the present invention is to provide a junction for sliding block adapters which allows the use of a smaller axial bearing compared to those currently adopted.

The present invention allows the above objects to be achieved by means of a connection junction of an adapter to a flange for controlling the axial loads which comprises a central pin arranged perpendicular to the longitudinal axis of the adapter; multiple sliding blocks slidingly connected by means of the central pin to the adapter; a block fixed to the flange and at least two complementary and interfaced series of dampers connected to the central pin.

According to a further aspect of the invention, a rolling plant is provided which comprises at least one motor, at least one adapter for transmitting the motor motion to rolls of a rolling stand, the above said elastic junction for connecting the adapter on the motor side or on the stand side or on both the motor side and the stand side, wherein the motor and/or the rolling stand comprise a flange configured for fixing the block of the elastic junction.

The elastic junction for sliding block adapter, object of the present invention, allows the control of the axial loads resulting from the operation of the rolling plant and the transmission to the corresponding motor of only a certain well-defined and controllable load, which is by far lower than the load that would be transmitted by other currently known solutions, up to nearly completely eliminating the same load.

The device, object of the present invention, in fact uses the adapter as an elastic member having the features of a spring which acts in the axial direction and which therefore transmits known and well definable loads.

The introduction of an elastic element, comparing it to a spring characterized by an elastic constant k, allows the axial loads that reach the motor to be fixed at a certain value equal to $\Delta x * k$, where $\Delta x$ is the clearance between chock and shoulder.

It is therefore possible to size the axial bearing of the motor on this force and not on the entire axial force F which may develop during rolling.

The dependent claims describe preferred embodiments of the invention.

BRIEF DESCRIPTION OF THE DRAWINGS

Further features and advantages of the invention will appear more clearly from the detailed description of a preferred, but not exclusive, embodiment of a connection junction of an adapter to a flange, shown by way of a non-limiting example with the aid of the accompanying drawings, in which:

FIG. 1b shows a section view along a plane A-A of the elastic junction in FIG. 1a;

The same reference numerals in the figures identify the same elements or components.

DETAILED DESCRIPTION OF THE INVENTION

Figure 1A:
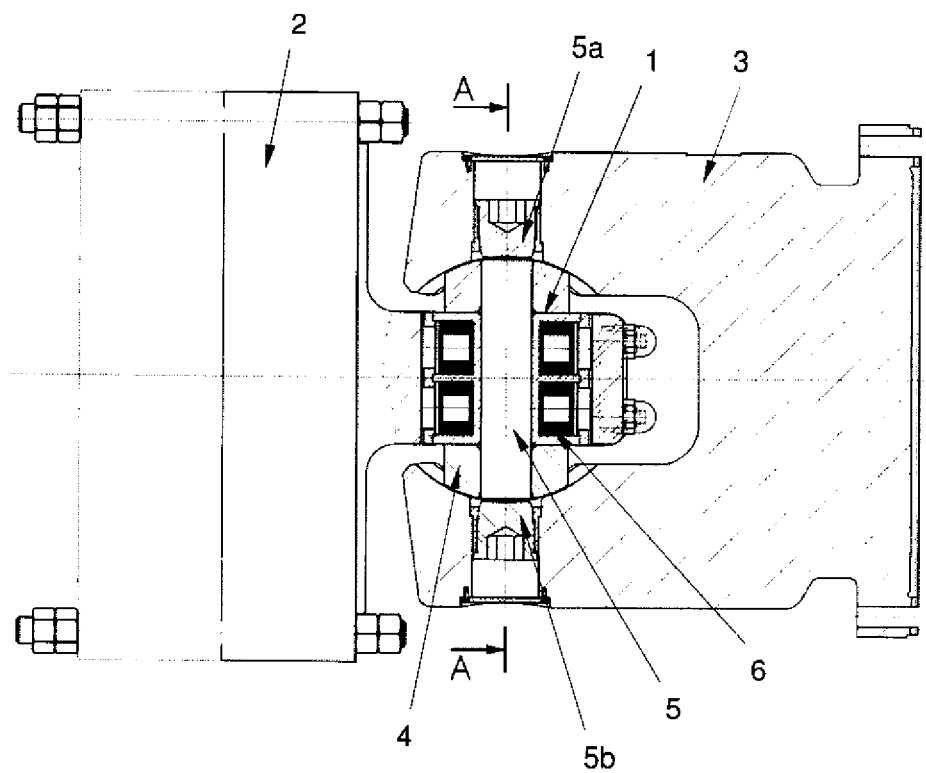
FIG. 1a shows a longitudinal section view of a junction according to the present invention for the interconnection of an adapter with the flange of a motor.

As shown in FIG. 1a, the device according to the present invention therefore consists of an elastic junction for connecting an adapter 3 in order to control the axial loads, comprising the following parts:
a block 1 which includes
a central pin 5 arranged perpendicular to the longitudinal axis of adapter 3,
at least two complementary and interfaced series of dampers 6 connected to pin 5;
sliding blocks 4 connected by means of the pin 5 to the adapter 3, where said sliding blocks 4 have sliding surfaces on corresponding complementary shape surfaces of the flange 2.

In FIG. 1a there are provided only two complementary and interfaced series of dampers 6. In particular, there provided two pairs of dampers 6, each damper being housed in a corresponding seat produced in the block 1 (see FIG. 1c). In each pair the two dampers 6 are placed along a same axis and are symmetrically arranged to each other with respect to a first plane containing the longitudinal axis of the pin 5. Moreover the two pairs of dampers, one pair being arranged above the other pair, are symmetrically arranged to each other with respect to a second plane, perpendicular to the first plane, containing the longitudinal axis of the adapter 3.

Block 1 is provided with spring packs 6 positioned on both sides so as to act in both directions. Block 1 is mounted in the flange 2 with which the adapter 3 must couple and, finally, the adapter 3 is made integral with block 1 by means of the pin 5.

Sliding blocks 4 are then connected by means of the pin 5 to the flange 2 and to the adapter 3 and allow the torque to be transmitted from the first one (flange) to the second one (adapter).

The axial stresses coming for example from the rolling cylinders are transmitted to adapter 3, to pin 5, and thus to block 1. The spring packs 6 inside block 1 are thus compressed on one side and correspondingly elongated on the opposite side, allowing flange 2 to remain stationary at a respective translation of adapter 3, pin 5 and sliding blocks 4. The device is bidirectional, i.e. it intervenes both in case of tensile forces and of thrust forces on adapter 3.

Sliding blocks 4, constrained to pin 5, are then made to translate axially as a result of a force produced for example in the rolling stand; however, they are in contact with flange 2 and, in order to have this relative movement between sliding blocks 4 and flange 2, it is necessary to overcome the friction forces which develop between the two elements as a result of the torque transmitted by flange 2 to adapter 3 by means of sliding blocks 4. This ensures that the device, object of the invention, is only activated when necessary: that is, it is activated only when the loads involved exceed the frictional forces between flange 2 and sliding blocks 4.

Figure 1B:
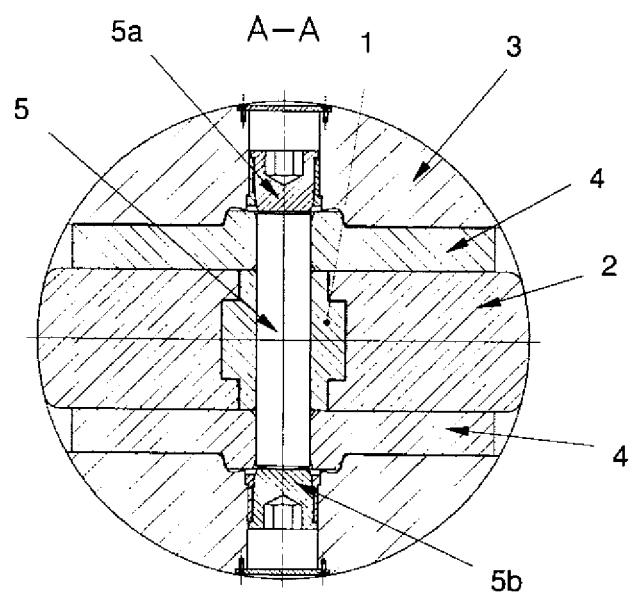

FIG. 1b shows a section along plane A-A of the elastic junction shown in FIG. 1a. Dampers 6 may be selected from the solutions commonly known in the art. Preferably, in the present case, spring packs, hydraulic dampers or a combination thereof find a better application.

According to the present invention, block 1 is configured for the connection between adapter 3 and flange 2 of a motor block or, distally from the motor on the opposite end of adapter 3, between adapter 3 and the rolls of a rolling stand.

Figure 2:
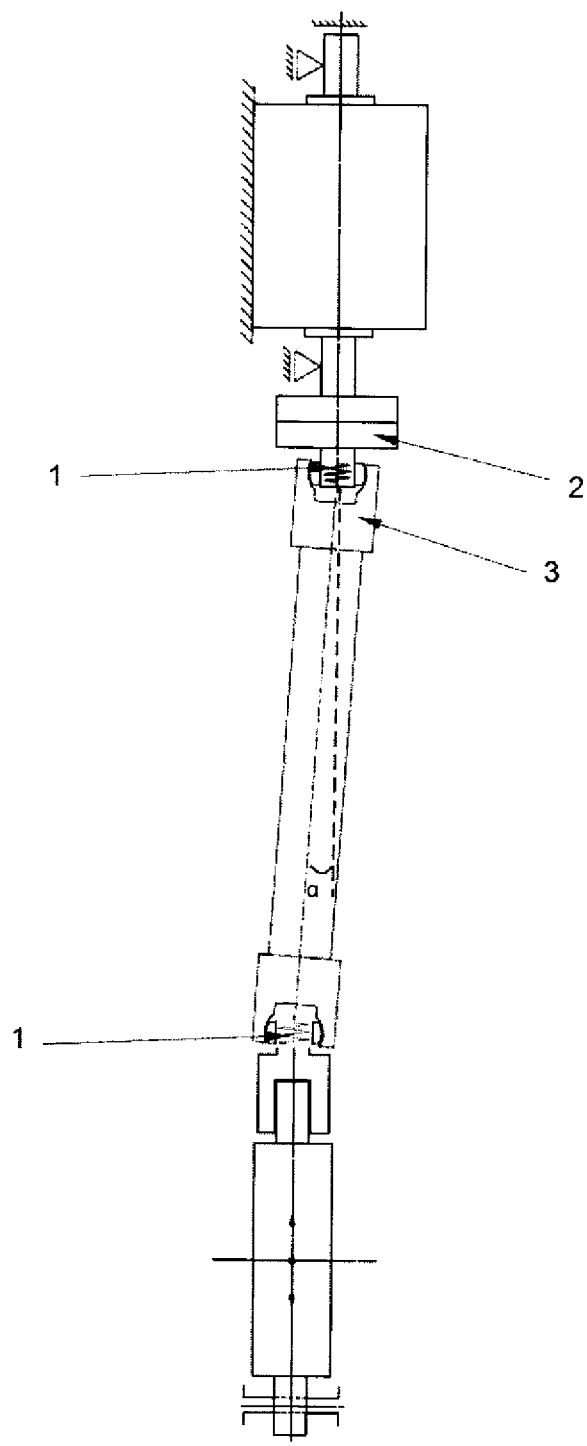
FIG. 2 shows a junction according to the present invention, applied on sliding block adapters for a rolling plant.

The invention also provides for the alternative of combining both coupling possibilities (FIG. 2).

Figure 1C:
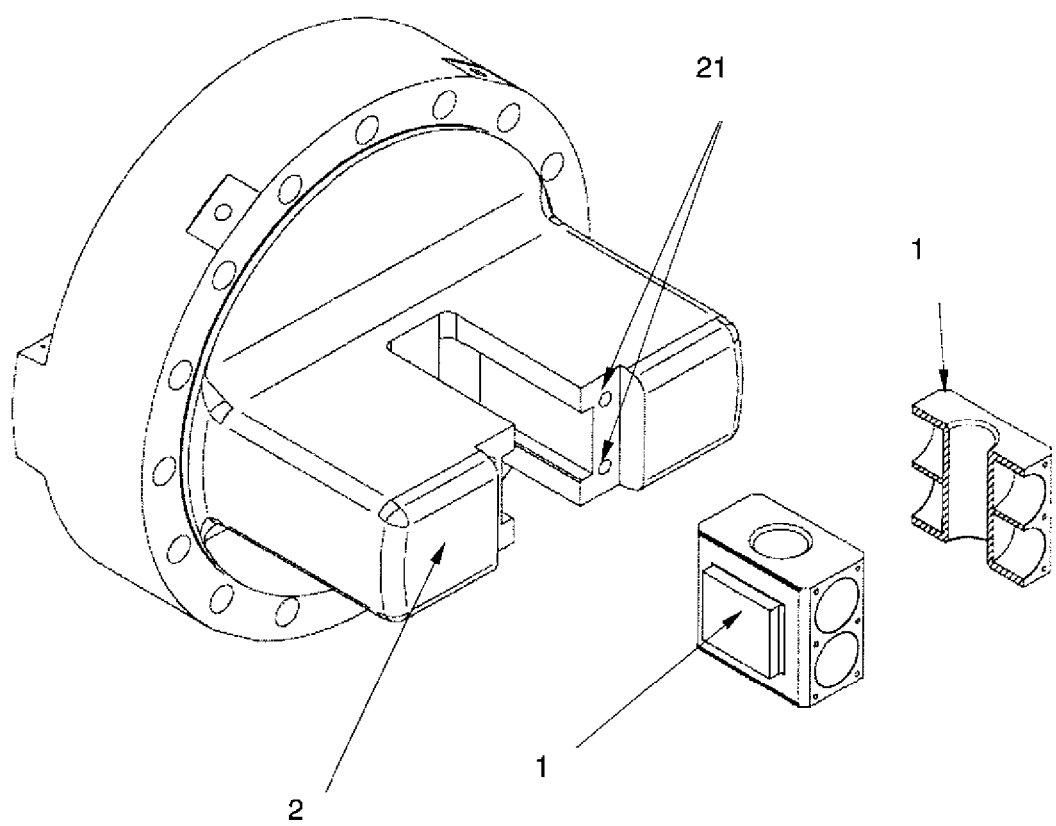
FIG. 1c shows an exploded view of an enlarged detail of the flange with joint for block and relative fixing points.

Block 1 also comprises one or more fixing means for fixing the block to flange 2 or to the rolls of the rolling stand. FIG. 1c shows a view of said flange 2 and of joints or fixing points 21 for block 1.

In order to anchor the pin to the adapter head, pin 5 comprises two connecting ends 5a, 5b which protrude outside sliding blocks 4. Such connecting ends 5a, 5b can have a sectional diameter greater than the remaining pin body and are provided with joints for their fixing to adapter 3.

The junction for sliding block adapters of the present invention has the major advantages when used in rolling plants in which the adapters are used for the transmission of motion from the motor to the rolls of a rolling stand, as schematically shown in FIG. 2.

In this specific plant configuration, the axis of adapters 3 is tilted with respect to the longitudinal axis of flange 2 by an angle α which can be between 0 and 15 degrees, thus allowing a degree of freedom such that any axial load, either transverse load or angular torsion load, can be effectively counterbalanced without damaging the motor side on one end and/or the roll side on the other end.

Such elastic and, at the same time, articulated movement of the adapters is in fact ensured by the position of pin 5 which, for each position taken, is always perpendicular to the longitudinal axis of the adapters. Moreover, the FIG. 2 also shows the alternative embodiment of the invention according to which block 1 is also arranged between the distal end of the adapter (distal with respect to the flange 2) and the rolls of the rolling stand.

Figure 3:
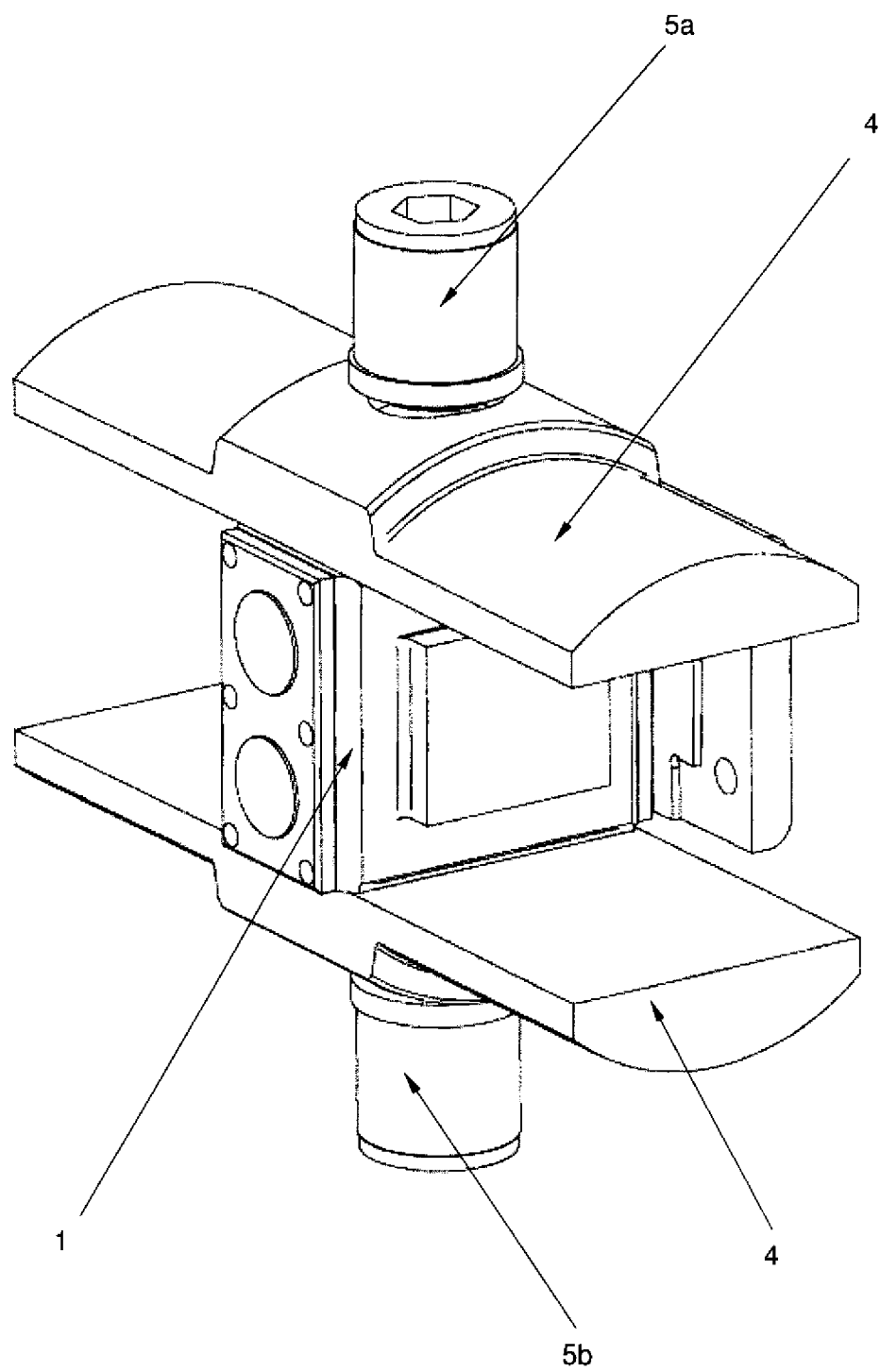
FIG. 3 shows a perspective view of the components of the junction according to the present invention.

A possible configuration of the components constituting the object of the present invention is shown in FIG. 3 which shows the relative position of block 1 with respect to sliding blocks 4 and to ends 5a and 5b of pin 5. In this particular embodiment, ends 5a and 5b of pin 5 protrude from the upper and lower curved surfaces of sliding blocks 4 to be securely attached inside the corresponding seats in adapter 3. This ensures that pin 5 is always perpendicular to the axis of adapter 3.

With the aid of the device object of the present invention, the loads exerted on the adapters are not transmitted to the motor in their entirety: it has been seen that they can be reduced more than 50% compared to the solutions previously adopted, up to being almost completely eliminated.

The invention claimed is:

1. A connection junction for connecting an adapter to a flange for controlling axial loads, comprising
    a central pin arranged perpendicular to a longitudinal axis of the adapter,
    multiple sliding blocks slidingly connected by means of the central pin to the adapter,
    a block fixed to the flange, the block of the flange being arranged within an end projection of the flange and including the central pin,
    and at least two interfacing and complementary series of dampers housed inside the block of the flange in direct contact with the central pin,
    wherein the at least two interfacing and complementary series of dampers are compressed on one side and correspondingly elongated on the opposite side, allowing the flange to remain stationary at a respective translation of the adapter, the central pin, and the sliding blocks when axial load are transmitted to the block of the flange.

2. A connection junction according to claim 1, wherein the at least two interfacing and complementary series of dampers are spring packs, hydraulic dampers or a combination thereof.

3. A connection junction according to claim 1, wherein the block of the flange is positioned for a connection, between the adapter and the flange, of a motor block or of rolls of a rolling stand or of both motor block and rolls of a rolling stand.

4. A connection junction according to claim 3, wherein the block of the flange comprises one or more fixing means for fixing to the flange or to the rolls of the rolling stand.

5. A connection junction according to claim 1, wherein the central pin comprises two connecting ends which protrude outside the sliding blocks.

6. A connection junction according to claim 5, wherein said connecting ends have a sectional diameter greater than a remaining central pin body.

7. A connection junction according to claim 5, wherein said connecting ends are provided with joints for affixing to the adapter.

8. A connection junction, according to claim 6, wherein said connecting ends are provided with joints for affixing to the adapter.

9. A rolling plant comprising at least one motor, at least one adapter for transmitting a motor motion to rolls of a rolling stand, and the connection junction according to claim 1 for connecting the at least one adapter to the at least one motor, or the at least one adapter to the rolling stand, wherein the at least one motor and the rolling stand each comprises a flange configured for fixing the block of the connection junction.

10. A rolling plant comprising at least one motor, at least one adapter for transmitting a motor motion to rolls of a rolling stand, and the connection junction according to claim 1 for connecting the at least one adapter to the at least one motor, or the at least one adapter to the rolling stand, wherein the at least one motor or the rolling stand comprises a flange configured for fixing the block of the connection junction.

* * * * *